(12) United States Patent
Hsu

(10) Patent No.: US 7,987,982 B2
(45) Date of Patent: *Aug. 2, 2011

(54) RETAINER RING FOR A WIRE PACKAGE AND METHOD OF USING THE SAME

(75) Inventor: Christopher Hsu, Mentor, OH (US)

(73) Assignee: Lincoln Global, Inc., City of Industry, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/822,913

(22) Filed: Jun. 24, 2010

(65) Prior Publication Data

US 2010/0270194 A1    Oct. 28, 2010

Related U.S. Application Data

(60) Division of application No. 12/070,881, filed on Feb. 21, 2008, now Pat. No. 7,798,326, which is a continuation of application No. 10/873,673, filed on Jun. 22, 2004, now Pat. No. 7,367,452.

(51) Int. Cl.
*B65D 85/04* (2006.01)
*B65D 85/66* (2006.01)

(52) U.S. Cl. .......... 206/408; 206/397; 206/389

(58) Field of Classification Search .......... 206/389, 206/397, 408, 409, 407, 818, 459.5, 594.1; 40/124.04

See application file for complete search history.

(56) References Cited

U.S. PATENT DOCUMENTS

| | | | |
|---|---|---|---|
| 2,864,565 | A | 12/1958 | Whearley |
| 3,051,988 | A | 9/1962 | Max |
| 3,053,410 | A | 9/1962 | Eaddy |
| 4,320,833 | A | 3/1982 | Antoniotti et al. |
| 4,395,043 | A | 7/1983 | Gargione |
| 4,869,367 | A | 9/1989 | Kawasaki et al. |
| 5,078,269 | A | 1/1992 | Dekko et al. |
| 5,105,943 | A | 4/1992 | Lesko et al. |
| 5,277,314 | A | 1/1994 | Cooper et al. |
| 5,692,700 | A | 12/1997 | Bobeczko |
| 5,819,934 | A | 10/1998 | Cooper |
| 5,827,170 | A | 10/1998 | Gebran |
| 5,845,862 | A | 12/1998 | Cipriani |
| 5,942,961 | A | 8/1999 | Srail et al. |
| 6,109,005 | A | 8/2000 | Fogle |
| 6,273,660 | B1 | 8/2001 | Ozgen et al. |
| 6,406,419 | B1 | 6/2002 | Farahmand |
| 6,547,176 | B1 | 4/2003 | Blain et al. |

(Continued)

FOREIGN PATENT DOCUMENTS

FR    2 278 617 A1    2/1976

(Continued)

OTHER PUBLICATIONS

Flexmag Industries, Incorporated; Material Safety Data Sheet; Jun. 19, 2002; 1 page.

*Primary Examiner* — Steven A. Reynolds
(74) *Attorney, Agent, or Firm* — Hahn Loeser & Parks LLP

(57) ABSTRACT

A retainer ring is provided for use in a welding wire package having looped magnetic welding wire. The ring is a flat sheet of flexible permanent magnet material with an outer periphery and an inner periphery and includes printed material on the ring which can be cut from the ring and affixed to any metal surface.

20 Claims, 3 Drawing Sheets

U.S. PATENT DOCUMENTS

| | | |
|---|---|---|
| 6,580,348 B1 | 6/2003 | Hundt et al. |
| 6,745,899 B1 | 6/2004 | Barton |
| 7,100,863 B2 | 9/2006 | Hsu et al. |
| 7,171,070 B1 | 1/2007 | Birk et al. |
| 7,178,755 B2 | 2/2007 | Hsu et al. |
| 7,225,568 B1 | 6/2007 | Rizzo |
| 7,367,452 B1 | 5/2008 | Hsu |
| 2001/0006184 A1 | 7/2001 | Ohike |
| 2002/0000391 A1 | 1/2002 | Kawasai et al. |
| 2005/0023392 A1 | 2/2005 | Hsu et al. |
| 2005/0167313 A1 | 8/2005 | Annetts |

FOREIGN PATENT DOCUMENTS

| | | |
|---|---|---|
| JP | 3-264169 A | 11/1991 |
| JP | 4-112169 A | 4/1992 |
| JP | 4-133973 A | 5/1992 |
| JP | 9-323120 A | 12/1997 |
| JP | 2001-302096 A | 10/2001 |
| SU | 584925 A2 | 12/1977 |

RETAINER RING FOR A WIRE PACKAGE AND METHOD OF USING THE SAME

CROSS-REFERENCE TO RELATED APPLICATIONS

This application is a divisional of U.S. patent application Ser. No. 12/070,881, filed on Feb. 21, 2008, now pending, which is a continuation of U.S. patent application Ser. No. 10/873,673, filed on Jun. 22, 2004, now U.S. Pat. No. 7,367,452.

TECHNICAL FIELD

The present invention relates to welding wire packaging and more particularly to an improved retainer ring for a welding wire package that can be re-used as a refrigerator style magnet when the wire packaging is discarded.

BACKGROUND OF INVENTION

In the welding industry, tremendous numbers of robotic welding stations are operable to draw welding wire from a package as a continuous supply of wire to perform successive welding operations. The advent of this mass use of electric welding wire has caused tremendous research and development in improving the packaging for the bulk welding wire. A common package is a drum where looped welding wire is deposited in the drum as a wire stack, or body, of wire having a top surface with an outer cylindrical surface against the drum and an inner cylindrical surface defining a central bore. The central bore is often occupied by a cardboard cylindrical core. It is common practice for the drum to have an upper retainer ring that is used in transportation to stabilize the body of welding wire as it settles. This ring remains on the top of the welding wire to push downward by its weight so the wire can be pulled from the body of wire between the core and the ring. Each loop of wire has one turn of built-in twist so that when it is paid out, the twist introduced by releasing a loop of wire is canceled. Hence the wire is "twist-free" when it reaches the contact tip of the welding gun. The built-in twist causes the wire to spring up from the top of the stack when unrestrained. The weighted ring prevents wire from springing up due to the built-in twist. The weight of the ring is critical. Heavier rings tend to bend or recast the wire, causing wire to wobble when it exits the contact tip, although it is more effective to prevent tangle. Lighter rings can be easily lifted by the wire during payout, thus losing its contact to the top of the wire stack; and thereby losing its intended purpose of restraining wire movement at the top of the wire stack. Lighter rings have more propensity of tangle, although producing less wire wobble. This is the pitfall of the weighted ring design, essentially facing the difficulty of striking a balance of less tangle and less wire wobble. Tangles are detrimental to the operation of the package since they cause down time of the robotic welding station. Tangles are caused by many adverse movements of the wire loops on top of the wire stack. The wire has a winding cast that can snap around the outside of the retainer ring or the wire can bunch and slip at the inside of the retainer ring. The most common tangle is caused as wire is pulled from the inside of the ring and is referred to as "e script" because of its shape. An e script tangle stops operation of the welder and must be removed. Retainer rings so far on the market are not effective in preventing e script tangles. This type of tangle is caused by poor alignment of drive rolls of the wire feeder that builds up back-twist in the wire as it feeds the wire. The twist ultimately makes its way back to the drum and leads to an e script tangle. The objective of a retainer ring design is to increase operating welding time between successive e-tangles. The weighted retainer rings have not been successful in eliminating such tangles. The present invention is related to a retainer ring which essentially eliminates e script tangles in the welding wire being pulled from the center of the looped wire body of a drum package.

In addition, due to the high volumes of wire used during many welding operations, especially robotic welding operations, there is also a need for a wire package that can be easily and economically disposable. As can be appreciated, it is not economical to re-use the packaging utilized to ship and dispense the welding wire.

STATEMENT OF THE INVENTION

In accordance with the present invention, the standard weighted retainer ring is formed from a thin flat, flexible permanent magnet sheet. Thus, the welding wire new package includes a cylindrical drum with a central axis and containing multiple layers of looped welding wire defining the wire stack to be paid out, which body has an upper ring shaped surface with an outer cylindrical surface generally matching the drum and an inner cylindrical surface defining a central bore concentric with the drum axis. The wire body is overlaid with a flexible permanent magnet ring on the top of the upper ring shaped surface. This magnet retainer ring allows welding wire to be paid out from under the ring and upwardly from the central bore of the welding wire body loaded into the drum. The flexible magnet sheet is a standard commercial product; however, its use as a retainer ring for a welding wire package involves cutting the commercial sheet into a ring shape having an outer periphery covering or overhanging the wire stack and an inner periphery which is generally circular and matches the inner surface of the stored welding wire stack. Furthermore, in view of the fact that the magnet retainer ring will be disposed of after the welding wire in the wire package is consumed, the magnetic retainer ring is printed with marketing material such as a company logo which can be cut from the ring and used by the end user in similar fashion as a refrigerator magnet. This reduces the amount of waste produced by the packaging and provides an effective marketing tool.

The primary object of the present invention is the provision of a retainer ring for a welding wire package wherein the retainer ring is formed from a sheet of flexible permanent magnet material that is held on the top of the wire by the magnetic force created by the sheet and not by its weight and which includes material printed on the ring that can be cut from the ring and affixed to virtually any metal object.

A further object of the present invention is the provision of a retainer ring, as defined above, wherein marketing material is printed on the ring.

Still a further object of the present invention is the provision of a retainer ring, as defined above, wherein the retainer ring reduces the amount of package material that is discarded after the wire in the packaging is consumed.

Another object is to provide a medium to easily communicate marketing material to the end user.

These and other objects and advantages will become apparent from the following description taken together with the accompanying drawings.

BRIEF DESCRIPTION OF DRAWINGS

The foregoing objects, and more, will in part be obvious and in part be pointed out more fully hereinafter in conjunc

DESCRIPTION OF PREFERRED EMBODIMENTS

Figure 1:
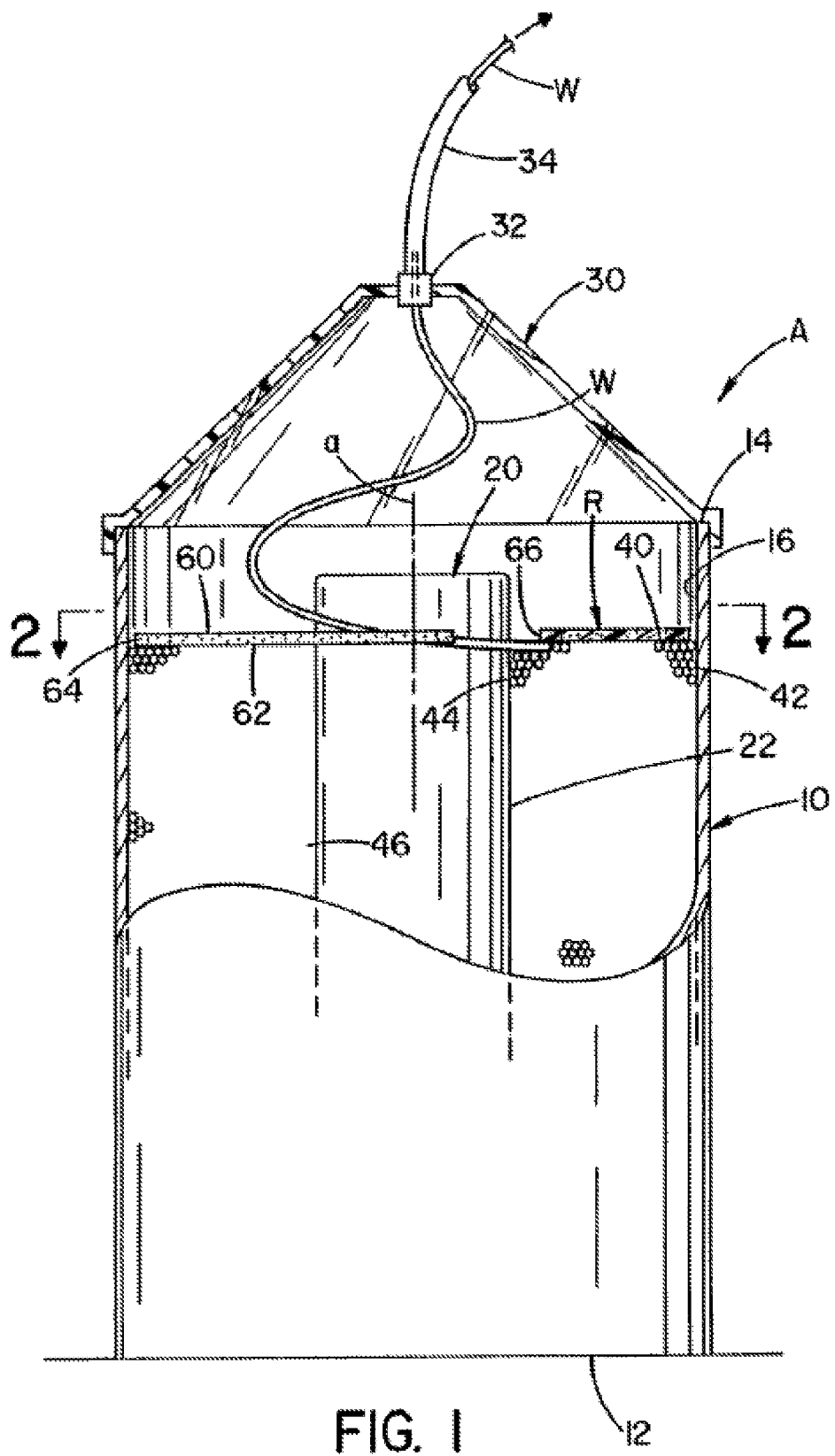
- FIG. 1 is a side elevational view of a welding wire package shown in partial cross-section that includes a retainer ring according to the present invention.
Figure 2:
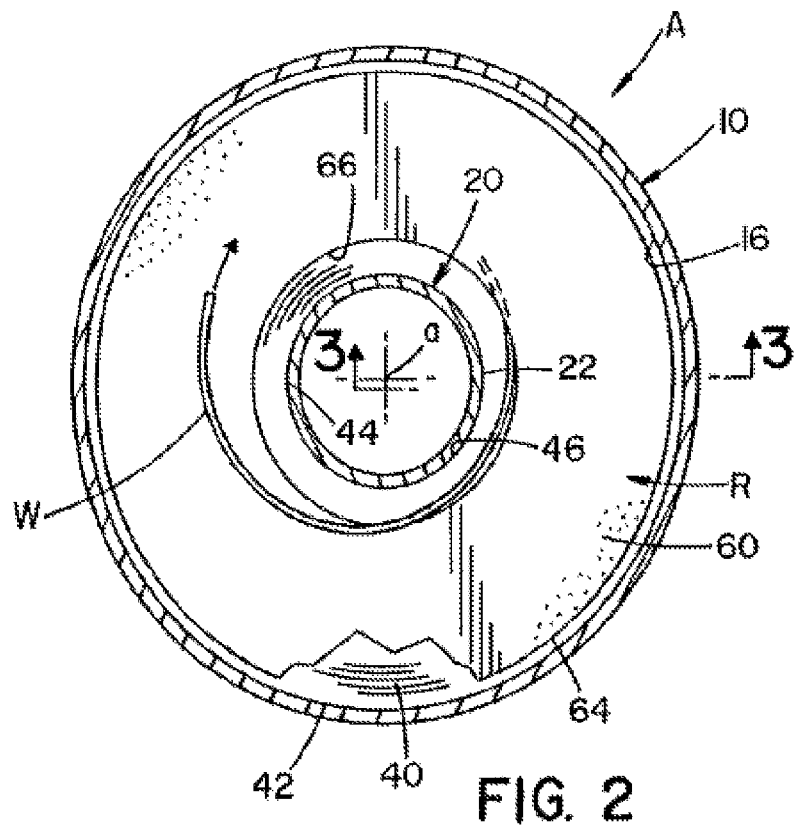
FIG. 2 is a cross sectional view taken generally along line 2-2 of FIG. 1.
Figure 3:
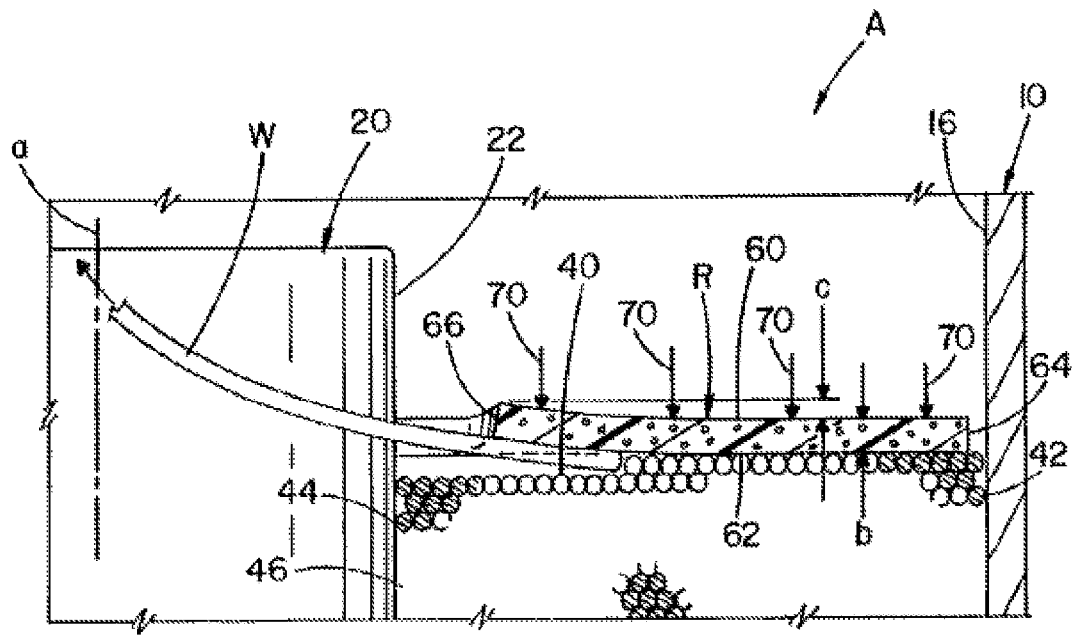
FIG. 3 is an enlarged partial view showing, in cross-section, the operating characteristics of the retainer ring of the present invention.

A standard welding wire drum type package is shown in FIGS. 1-3 wherein wire W is stored in and paid out of cylindrical drum 10 having a bottom 12, a top 14 and an inside diameter 16. In accordance with this type of drum it is common practice to use a cylindrical cardboard core 20 having an outer diameter 22. Inside surface 16 and outside surface 22 are cylindrical and concentric with a central axis a of drum 10. At the welding facility, the top or lid of drum 10 (not shown) is removed and replaced with a feeding hat 30 including an upper grommet 32 communicating with a standard feed tube 34. Wire W is pulled from drum 10 during the welding operation. Package A is loaded at the wire manufacturing facility by being looped around core 20 to define a body of welding wire having a top surface 40, an outer cylindrical surface 42 against surface 16 and an inner cylindrical surface 44 against or close to surface 22. In this manner, a central vertically extending bore 46 is concentric with axis a and around core 20. In some instances, the core is not used, but center bore 46 is provided in the wire looping operation. The wire is looped in a manner that has a cast to facilitate payout with a minimum of tangles. However, while the invention of this application is described in connection with drum containers, it should be appreciated that it can be used in connection with virtually any welding wire container which utilizes a retainer ring for controlling the unwinding of the wire.

The present invention relates to a retainer ring R that is used in drum 10 to prevent tangles as wire W is pulled from the body of wire. Ring R is cut from a flexible permanent magnet sheet and has a top surface 60 and a bottom surface 62. The sheet is cut into a shape defining an outer periphery 64 and an inner periphery 66. As shown in FIGS. 1-3, ring R is spaced slightly inward of surface 16 and is not quite as small as the circumference of surface 22. Essentially, ring R will fit within drum 10 and allow a gap between periphery 66 and surface 22 so wire W can be drawn from the top of the wire body and from under the retainer ring. This payout action is illustrated in FIG. 3.

A suitable magnetic sheet from which ring R is formed is available from Flexmag Inc. in Marietta, Ohio. The ring has a thickness b that is preferably 1/16 of an inch. The thickness can be adjusted generally between about 0.01-0.10 inches. The preferred sheet is made from ferrite particles in a non-magnetic binder. The ferrite is normally barium ferrite and the binder is polyethylene. The magnetic strength of the flexible sheet is preferably 0.6 Megagauss Oersteds. However, it has been found that a magnetic sheet having less than about 1.0 Megagauss Oersteds can be used. Of course, other magnetic particles can be used instead of the low cost ferrite, which is normally used in the commercial flexible permanent magnet sheets. The sheets can be easily cut by a punch press without losing any magnetic energy. As shown in FIG. 3, one advantage of this type of ring is that ring R is moved upwardly at the circumferential location where the wire is being pulled from the drum. This is illustrated as a flexed or lifted distance c. At the same time, the downward force on the top surface 40 is maintained constant as indicated by arrows 70. Thus, the weight of the ring is not controlling payout of wire W. The magnetic force of the ring holds the ring down, except where it is being pulled upwardly allowing removal of wire W.

Figure 4:
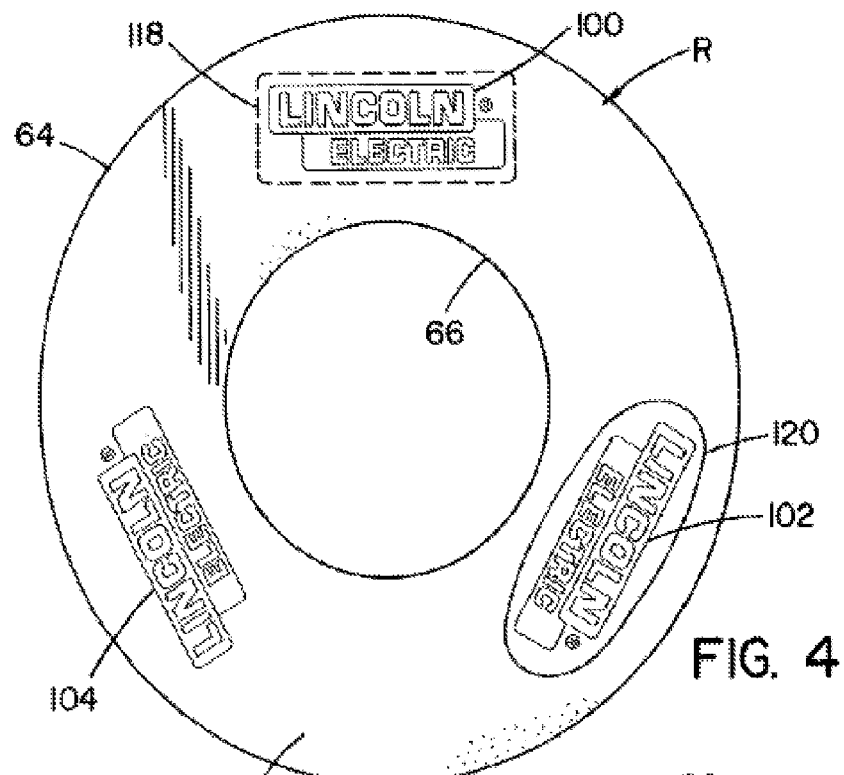
FIG. 4 is an enlarged plan view of the retainer ring shown in FIG. 1.
Figure 5:
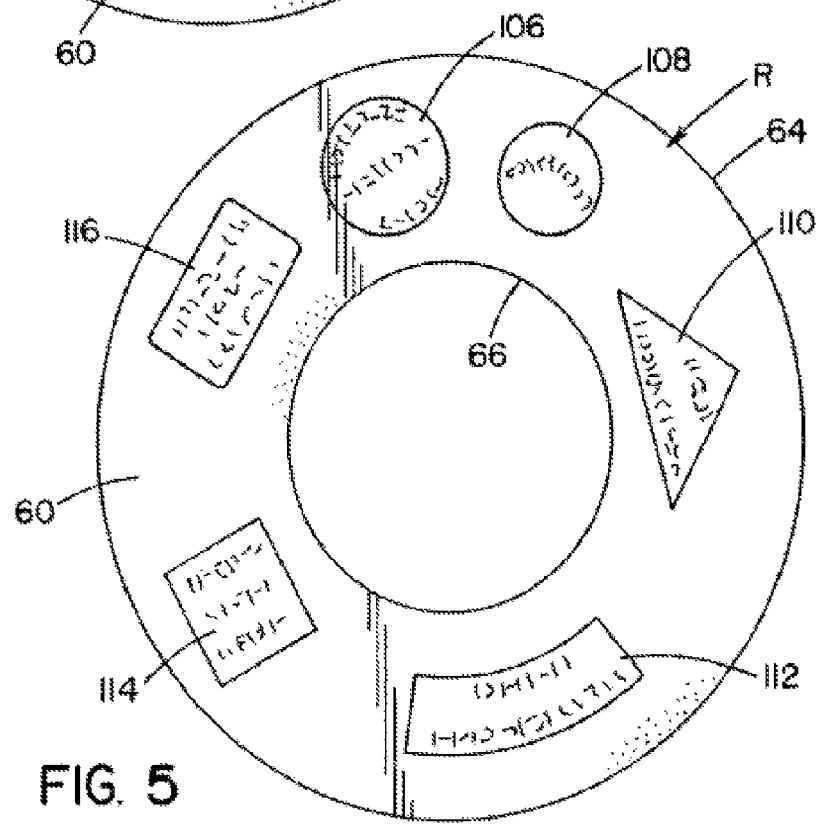
FIG. 5 is an enlarged plan view of another embodiment of the retainer ring shown in FIG. 1.

Referring to FIGS. 4 and 5, ring R is also printed on top surface 60 with printed material(s) which will be discussed in greater detail below. Accordingly, after the wire is consumed, the ring can be re-used as one or more refrigerator-type magnets to display the printed material. As can be appreciated, while these printed portions can be magnetically attached to a refrigerator, they can also be magnetically attached to virtually any metal objects including, but not limited to, a metal tool box or a metal enclosure. As a result, a functional byproduct of ring R is created to minimize waste.

In greater detail, after the welding wire is consumed, the end user of the welding wire package can remove ring R from the package and cut one or more of printed materials 100, 102, 104, 106, 108, 110, 112, 114 and/or 116 from the ring. The end user can then use the piece(s) cut from the ring as a refrigerator-style magnet or give them to others for the same use. The printed material can be within a cutting guide line 118, as is shown for printed material 100, to help direct the cutting by the end user. Further, cutting line 118 can include at least a partial perforation to make removing the printed material easier. In addition, the printed material can include a printed background portion 120 containing a desired background color and/or design for the printed material. As can be appreciated, by including a printed background, only a portion of the ring needs to be printed based on the number of printed materials used on the ring. In addition, by including background portion 120, the printed material does not need to be precisely cut from the ring. Ring R can further include several of the same printed materials on one ring so that the end user can pass out the printed material to multiple co-workers and/or other individuals for each wire package purchased. Further, since ring R is made from a flexible plastic material, the printed material can be easily cut from the ring.

As is shown in FIGS. 4 and 5, the printed material can be a wide variety of printed material. Further, the printed material can be a combination of different printed materials or a single design repeated about the ring. The printed material can include one or more company logos, service marks and/or trademarks so that, as is stated above, the material can be passed out to more than one individual. In addition, the printed material can be virtually any type of promotional material and can include the promotion of an event such as a sporting event. The printed material can also be a variety of printed materials which essentially has no limit except for the amount of space available on surface 60. The printed material can also include purchasing information and/or contacts and can be printed directly on surface 60 of ring R in black print and/or colored print. In yet another embodiment, the printed materials can be labels affixed to surface 60. Regardless of the character of the material(s), surface 60 can be completely covered with a background color, such as white, and/or the printed material can include a small background portion extending about the printed material as is discussed above.

While considerable emphasis has been placed on the preferred embodiments of the invention illustrated and described herein, it will be appreciated that other embodiments and/or equivalents thereof can be made and that many changes can be made in the preferred embodiments without departing from the principals of the invention. Accordingly, it is to be distinctly understood that the foregoing descriptive matter is to be interpreted merely as illustrative of the invention and not as a limitation.

The invention claimed is:

1. A retainer ring for use in a welding wire package having welding wire, said ring comprising:
  a ring-shaped body comprising a flat sheet of flexible, permanent magnet material,
  the body having a top surface and a bottom surface, and including printed material on at least one of said top and bottom surfaces of said body, the printed material being positioned along one or more magnets being separable from said body;
    the body including an outer circumference and an inner periphery, the inner periphery being circular and sized to accommodate an outer diameter of a cylindrical core of a welding wire drum-type package.

2. The retainer ring as defined in claim 1, wherein said printed material includes marketing material.

3. The retainer ring as defined in claim 2, wherein said marketing material includes a company logo.

4. The retainer ring as defined in claim 1, wherein said printed material includes purchasing information including ordering information.

5. The retainer ring as defined in claim 1, wherein said printed material includes printed material printed directly on a surface of said ring.

6. The retainer ring as defined in claim 1, wherein said printed material includes a cutting guide line on said ring.

7. The retainer ring as defined in claim 6, wherein said cutting guide line includes perforations in said ring.

8. A retainer ring for use in a welding wire package having welding wire, said ring comprising:
  a ring-shaped body comprising a flat sheet of flexible, permanent magnet material,
  the body having a top surface and a bottom surface, and including printed material on at least one of said top and bottom surfaces of said body, at least a portion of the printed material including a cutting guide line;
    the body including an outer circumference and an inner periphery, the inner periphery being circular and sized to accommodate an outer diameter of a cylindrical core of a welding wire drum-type package.

9. The retainer ring as defined in claim 8, wherein said printed material includes marketing material.

10. The retainer ring as defined in claim 9, wherein said marketing material includes a company logo.

11. The retainer ring as defined in claim 8, wherein said printed material includes purchasing information including ordering information.

12. The retainer ring as defined in claim 8, wherein said printed material includes printed material printed directly on a surface of said ring.

13. The retainer ring as defined in claim 8, wherein said cutting guide line includes perforations in said ring.

14. A retainer ring for use in a welding wire package having welding wire, said ring comprising:
  a ring-shaped body comprising a flat sheet of flexible, permanent magnet material,
  the body having a top surface and a bottom surface, and including printed material on at least one of said top and bottom surfaces of said body and removable by means for removing;
    the body including an outer circumference and an inner periphery, the inner periphery being circular and sized to accommodate an outer diameter of a cylindrical core of a welding wire drum-type package.

15. The retainer ring as defined in claim 14, wherein said printed material includes marketing material.

16. The retainer ring as defined in claim 15, wherein said marketing material includes a company logo.

17. The retainer ring as defined in claim 14, wherein said printed material includes purchasing information including ordering information.

18. The retainer ring as defined in claim 14, wherein said printed material includes printed material printed directly on a surface of said ring.

19. The retainer ring as defined in claim 14, wherein said printed material includes a cutting guide line on said ring.

20. The retainer ring as defined in claim 14, wherein the means for removing comprises at least partial perforations for removing said printed material.

* * * * *